United States Patent [19]

Wehrmacher

[11] Patent Number: 5,073,703

[45] Date of Patent: Dec. 17, 1991

[54] APPARATUS FOR ENCODING ELECTRICAL IDENTIFICATION DEVICES BY MEANS OF SELECTIVELY FUSIBLE LINKS

[75] Inventor: William H. Wehrmacher, Prior Lake, Minn.

[73] Assignee: Datakey, Inc., Burnsville, Minn.

[21] Appl. No.: 502,177

[22] Filed: Mar. 30, 1990

[51] Int. Cl.[5] .............................................. G06K 19/06

[52] U.S. Cl. .................................. 235/492; 307/465.1; 337/297

[58] Field of Search .................... 235/492; 340/825.31; 70/278, DIG. 46; 307/465.1; 337/297

[56] References Cited

U.S. PATENT DOCUMENTS

| | | | |
|---|---|---|---|
| 3,702,464 | 11/1972 | Castrucci | 235/492 |
| 3,757,305 | 9/1973 | Hedin | 235/492 |
| 3,928,750 | 12/1975 | Wolflingseder | 235/492 X |
| 4,297,569 | 10/1981 | Flies . | |
| 4,326,125 | 4/1982 | Flies . | |
| 4,379,966 | 4/1983 | Flies . | |
| 4,436,993 | 3/1984 | Flies . | |
| 4,522,456 | 6/1985 | Wehrmacher . | |
| 4,578,573 | 3/1986 | Flies . | |

*Primary Examiner*—David Trafton
*Attorney, Agent, or Firm*—Vidas & Arrett

[57] ABSTRACT

Key-like portable electronic identification devices and other electronic devices adapted to be inserted into mating electrical receptacles. The bodies of the devices in their preferred embodiments are formed of plastic molded around a printed circuit substrate, the barrels of which, when positioned on edges of the board, are modified so as to function as electrical contacts. Simplified and improved encoding is provided by a set of fusible links. Dispersal space is provided around the fusible links for fused material to prevent reformation of a fused link.

16 Claims, 2 Drawing Sheets

APPARATUS FOR ENCODING ELECTRICAL IDENTIFICATION DEVICES BY MEANS OF SELECTIVELY FUSIBLE LINKS

BACKGROUND OF THE INVENTION

The invention relates to improvements in the functional design of electrical insertion devices such as key-like devices, credit card-like devices, identification tag devices and similar access and/or identification devices adapted for insertion into electrical or other contacting receptacles or other interactive electrical devices and systems. The invention is in one sense a further development of the inventions of U.S. Pat. No. 4,297,569 issued Oct. 27, 1981, entitled, "Microelectronic Memory Key With Receptacle and Systems Therefore; U.S. Pat. No. 4,326,125, issued Apr. 20, 1982, entitled "Improved Microelectronic Memory Key With Receptacle and Systems Therefor"; U.S. Pat. No. 4,379,966 issued Apr. 12, 1983 entitled "Receptacle For Electronic Information Key", U.S. Pat No. 4,436,993, issued Mar. 13, 1984 entitled Electronic Key; U.S. Pat. No. 4,522,456, issued Jun. 11, 1985 entitled "Electronic Tag Receptacle and Reader" and U.S. Pat. No. 4,578,573 issued Mar. 25, 1986, entitled "Portable Electronic Information Devices and Method of Manufacture", all of which are incorporated herein by reference.

Electrical devices of various types have been proposed in which a master circuit or electrical operating system of some kind, such as a computer system, is activated by use of a portable device which is physically contacted to or otherwise combined with the electrical system, as by insertion of the device into a slot or the like, to make electrical contact or connection with the system. This invention is concerned broadly with such portable devices and with such systems. However, it is specifically concerned with improved and simplified insertion access and/or identification devices per se which are inserted into the electrical receptacle of said systems or otherwise connected thereto. The devices may carry an electronic circuit means which may take the form of a data-carrying embedded circuit component but in their preferred form do not.

SUMMARY OF THE INVENTION

Electrical key-like devices for use with electrical receptacles and the like are described. A preferred embodiment is a low cost identification device or access device. The key-like device contains an electrical conductor element having electrical leads extending to a common internal termination point, the leads also having exposed portions along the edges of the device for contacting electrical contacts in a receptacle when the key-like device is inserted therein. In embodiments other than preferred, contacts do not have to be on the edges. In a card form for example they could be on a flat surface. The electrical leads in the key-like device each include a fusible element which may be selectively "blown" to disable certain of the device contacts leaving other contacts operative. This allows for encoding.

Webster's *New Collegiate Dictionary* 1977 *Edition* identifies the term "fuse" as an electrical safety device consisting of or including a wire or strip of fusible metal that melts and interrupts the circuit when the current exceeds a particular amperage. This is the general meaning of the words "fuse" and "fusible" as used herein.

DESCRIPTION OF THE PREFERRED EMBODIMENTS

Figure 1:
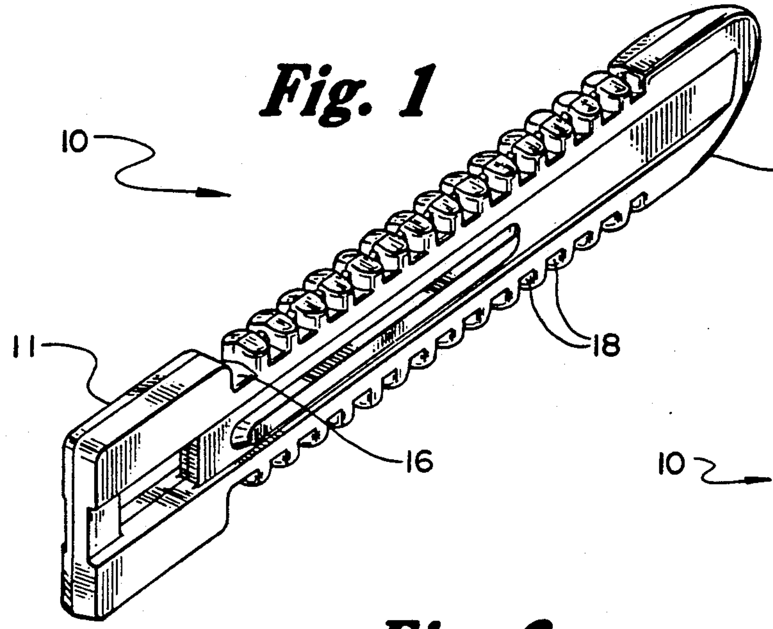
FIG. 1 is a perspective view of a preferred embodiment of the encodable arrangement of the insertion device encapsulated within a key form.
Figure 2:
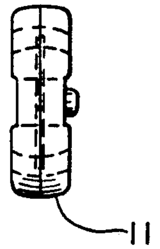
FIG. 2 is a rear elevational view thereof.
Figure 3:
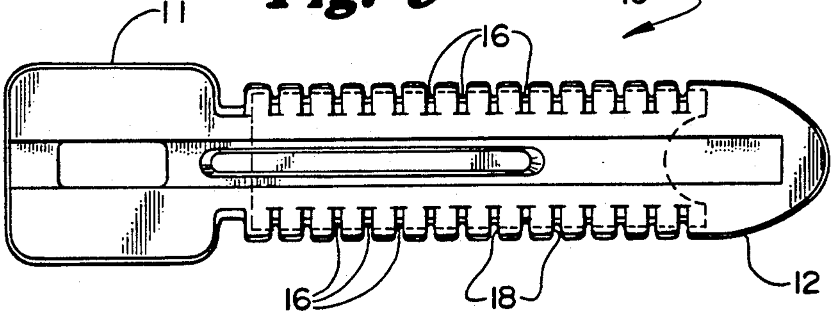
FIG. 3 is a right side elevational view thereof.

FIGS. 1 through 3 show a portable access device in the form of a key-like insertion device generally designated 10. Key 10 comprises non-conductive head and insert body portions 11 and 12, respectively. The insert body portion 12 contains an electrical circuit element such as a printed circuit board (shown in FIG. 4) generally designated at 14 embedded therein. Electrical contacts 16, which are connected to the embedded circuit element by an arrangement described further hereinbelow, lie disposed within spaced contact grooves 18 on the opposite edges of the key to form electrical contact areas thereon. The keys may be of various shapes and different lengths and may include a different number of grooves and contacts. Additionally, the insertion device may be of other shapes e.g., tags, cards and the like, as well as the key-like shapes described in this instance, which are the preferred embodiment.

Further structural details of a typical key of the type shown in FIGS. 1-3 will become apparent upon considering the manner of its construction with reference to FIGS. 4-9 along with FIGS. 1-3. It should be noted again that the number of electrical contacts included in the key may vary as desired.

Figure 4:
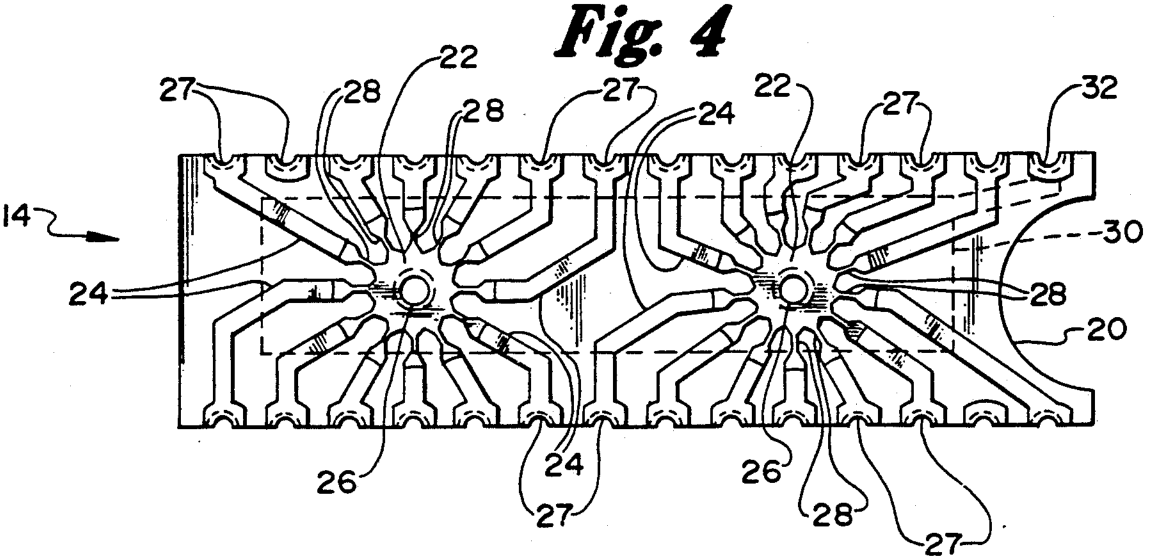
FIG. 4 is a profile view of a printed circuit board incorporating a preferred embodiment of the present invention.
Figure 5:
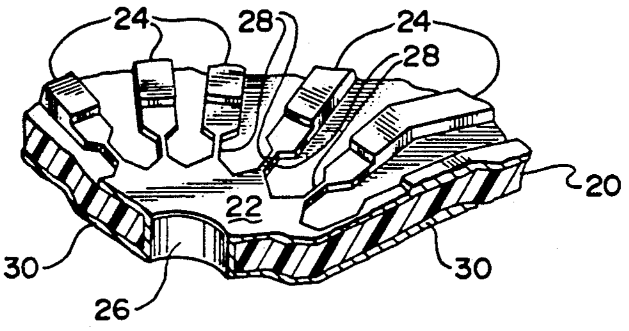
FIG. 5 is a fragmentary perspective view of the printed circuit board of FIG. 4.
Figure 6:
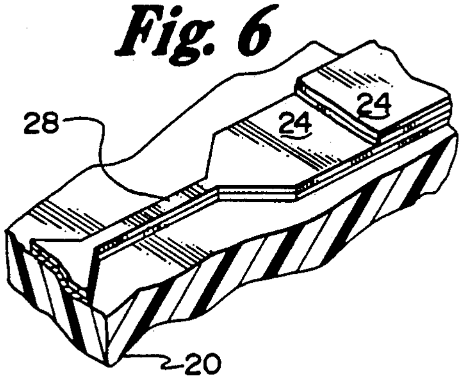
FIG. 6 is an enlarged fragmentary perspective view thereof.
Figure 7:
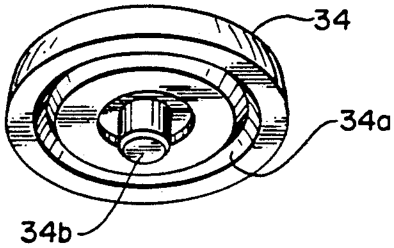
FIG. 7 is a perspective view of a registrable cap used in the preferred encapsulation arrangement of the invention.

Referring now to FIG. 4, there is shown a printed circuit board 14 manufactured in accordance with known printed circuit board manufacturing techniques. The printed circuit board 14 includes an insulating substrate 20, at least one termination pad 22 (two are shown in the preferred embodiment) functioning as a common conductive element and a conductive material such as copper deposited on the substrate to form continuous conductive paths or electrical leads 24, all of which lead to and terminate at a termination pad or common element 22. Nickel and gold or solder are also typically deposited for this purpose. Termination pads 22 include plated through-holes 26 which are also referred to herein as barrels. In the printed circuit art and herein, barrels comprise holes in a printed circuit board such as substrate 20, the inner surfaces of which are plated with a conductive coating similar to that used for the printed circuit leads 24. The edges of the board include partial or semicircular barrels 27 each of which is connected to one of the discrete leads 24.

In most instances, the printed circuit substrate stock is available in copper coated form. Selected areas of the copper coating are etched away leaving the copper paths. Through holes are drilled through the board in predetermined areas as at 26. The through-holes, the area surrounding them and the copper paths may then be plated with solder or the like to provide plated through-holes 26, etc.

Termination pad 22 as shown schematically in FIG. 4 is appropriately connected to the various printed circuit leads 24 as schematically shown. There is thus provided a continuous electrical path between the various portions of a termination pad 22, the barrels 26 and the partial barrels 27 which later function as electrical contacts 16 on the key.

Leads 24 are formed so as to include fusible links 28 which are designed to fuse or be "blown" when a convenient current is applied at a contacts 16, after the device has been encapsulated. This is described and discussed further hereinbelow.

The opposite side of each printed circuit board 20 also carries a conductive printed circuit path 30. This can be seen with reference to FIGS. 4-9 which show on the opposite side the segment 30. In this particular instance pathway 30 extends between the two terminal pads 22 and their respective barrels 26 to interconnect them thus providing common electrical connection between all of the conductive elements or the board. Layer 30 connects to a contact 32 as shown in FIG. 4. This pathway need not be fusible. Barrels 26 are thus mutually electrically connected as are termination pads 22 and all leads 24 and contacts 16 and contact 32.

Figure 8:
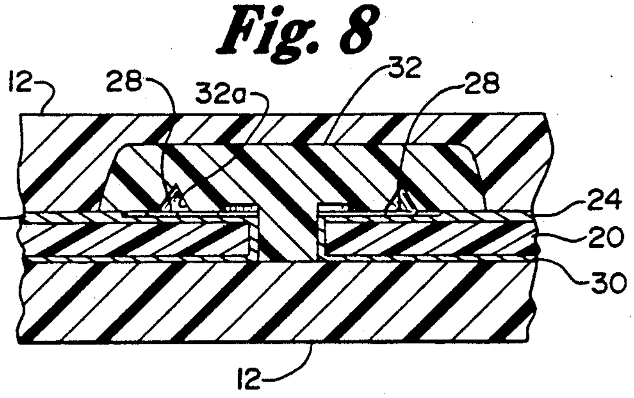
FIG. 8 is a fragmentary sectional detail taken through the central axis of said cap in assembly.
Figure 9:
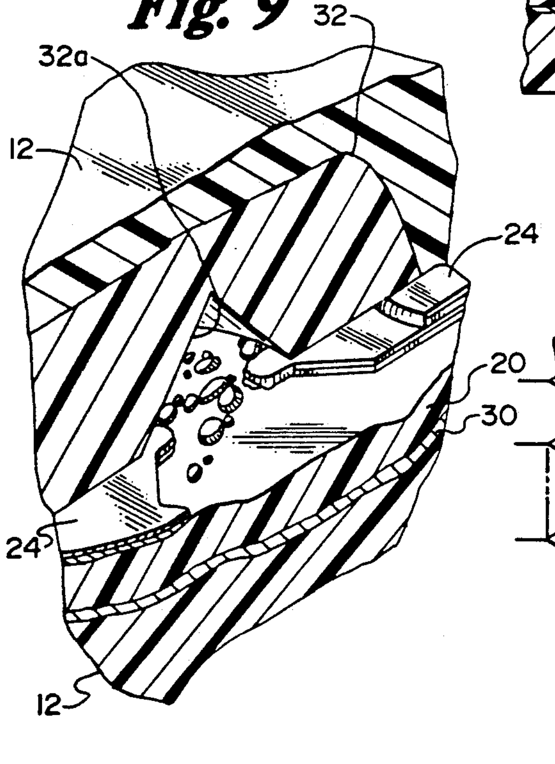
FIG. 9 is an enlarged fragmentary perspective detail illustrating the function of said cap.

It is important to the operation of the fusible links 28 that they not be directly encapsulated i.e., molded within the plastic encapsulation material. In practice, if this is done and a link is fused or "blown", the link material merely resolidifies in situ to reform a conductor path as it has no where to go. Thus it has been determined that a space must be assured around each link of fusible material to allow it to disperse, preventing reformation of a conductive path at the particular link. One preferred way of accomplishing this by means of cap 34 shown in FIGS. 7-9. Cap 34 is shaped to provide a hollow groove space 34*a* which, when cap 34 is mounted over a termination pad 22 by inserting mounting pin 34*b* into a barrel 26, provides a hollow space over and about each of the links 28 contacting that particular termination pad. In the embodiment shown in FIG. 4, two such caps are used. When so mounted, the space about each link which is thereby provided is shown in FIGS. 8 and 9. It can be seen that, following mounting of cap 34 on the printed circuit board, and molding or otherwise encapsulating a key body or other body shape around the printed circuit assembly will result in enclosing various portions thereof while leaving at least parts of the partial barrels exposed to form electrical contacts 16 and 32 and will, most importantly, provide space for dispersal of fusible material at each link as required and shown schematically in FIG. 9.

Generally, the idea of the invention in its preferred embodiment is to form, preferably by molding, the insertion device body such as a key, credit card body or identification tag body around a printed circuit which has been prepared substantially as described above to include at least are termination pad 22 connected to the conductive leads which radiate to contacts 16 and 32.

Preferably the key 10 or other insert body will be made of a molded non-conductive plastic such as Cycolac® ABS plastic which is available from Borg-Warner Chemicals International Center, Parkersbury, W. Va. 26101, also Lustran® ABS Monsanto Co. 800 No. Lindbergh Blvd. St. Louis, Mo. 63166 may be used. Other satisfactory materials will also be apparent to those familiar with the plastic molding art. Injection molding techniques are readily adaptable to the manufacture of these devices.

As can be seen by referring again to the Figs., the resultant molded key contains a printed circuit board or other substrate 20 enclosed within its body, the substrate carrying printed circuit paths 24, and the other circuit elements, which may be included on both sides of the printed circuit board, if desired.

It is to be understood that any arrangement of printed circuit paths, barrels and circuit elements may be utilized along with any configuration of insertion body device. Preferably, the barrels will be appropriately exposed on edges of the printed circuit substrate to provide electrical contacts for the device.

Figure 10:
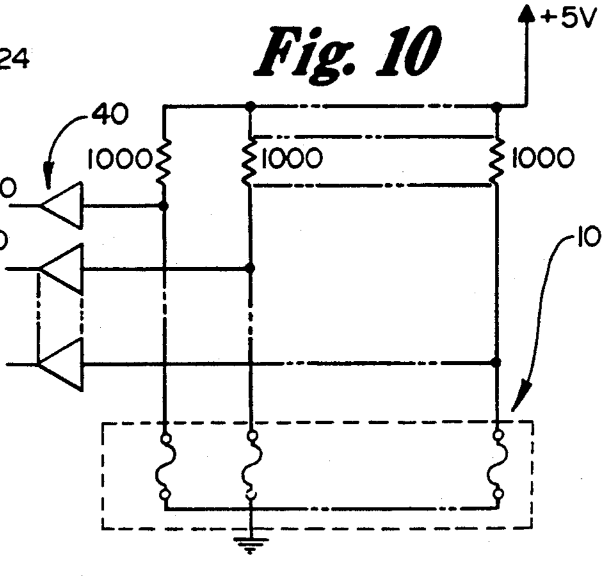
FIG. 10 is a schematic representation of a typical interface circuit incorporating the device of the invention.

In use, there is thus provided a portable access device which may be encoded by selectively "blowing" or fusing any one or more, in combination, of the fusibly linked pathways 28 resulting in a circuit arrangement having two different voltage states as between "blown" or "unblown" contacts, Various combinations thereof are possible. The two voltage states are made possible because the single contact 32 may be contacted at a first voltage level such as ground. This means that the terminal pads are also at that same level as are any "unblown" contacts If then, the contacts are connected via a master system or the like to a resistor of say 1000 ohms and 5 volts are applied thereto by a voltage sampling circuit or the like (see FIG. 10 for schematic diagram showing an overall arrangement including buffers 40). Those contacts which are blown will sample at 5 volts (one state) whereas those which are not blown will sample at 0 volts (a second state). Various other voltage levels may be used; ground is simply most convenient at the low level state. Various possible combinations may be selected and used as a code.

It can be seen that the invention facilitates the simplified encoding of portable electronic access devices and the like, such as keys and the like. The particular purpose of any microelectric or other circuit component utilized in the devices of the invention is not important within the broad scope thereof. Any circuit that is portable and can augment any other existing circuit is within the context of this invention. The insertion devices are specifically designed for insertion into a receptacle and establishing mating contact with electrical contacts therein. The key-like devices are specifically designated for insertion into a receptacle and rotation therein to a "locked" position by twisting to establish contact with the receptacle electrical contacts. The flat-form" devices such as credit card formats and identification tag formats require a different type of receptacle such as one which, during straight insertion will cause corresponding receptacle parts to move electrical contacts across the inserted device contact terminals and as such, accomplish a "wiping" contact or the like. For further details see the above referenced patents.

The number of terminal pads 22 in a device may vary. Also, in the preferred embodiment shown, 28 contacts are desired. This number was most conveniently arranged around two pads 22 as shown. However, one pad or more than two may be used depending on the number of contacts and the manner in which they are manufactured and arranged.

While this invention may be embodied in many different forms, there are shown in the drawings and described in detail herein specific preferred embodiments of the invention. The present description is an exemplification of the principles of the invention and is not intended to limit the invention to the particular embodiments illustrated.

This completes the description of the preferred and other embodiments of the invention. Those skilled in the art may recognize other equivalents to the specific embodiment described herein which equivalents are intended to be encompassed by the claims attached hereto.

What is claimed is:

1. In a portable electrical device for electrically accessing a master system or the like, the portable device comprising:

a) a conductive element adapted and arranged to operate at a first predetermined voltage level;

b) a plurality of electrical contacts each contact being connected to the conductive element via a fusible link or the like, the electrical contacts being adapted and arranged for electrical interconnection with the master system, and c) means encapsulating the aforesaid conductive element, electrical contacts and fusible links, whereby the portable device may be "coded" by selectively applying a fusing current to selected ones of the electrical contacts thereby creating a predetermined pattern of first electrical contacts having a first voltage state when electrically connected to the master system and second electrical contacts having a second voltage state when electrically connected to the master system, the improvement comprising:

an overall construction and arrangement of the device which includes means providing a dispersal space around the fusible links for fused material whereby reformation of a fused link is prevented.

2. In a portable access device carrying exposed electrical contacts and an embedded common conductor for connection to the contacts and individual fusible discrete electrical pathways interconnecting the common conductor to the contacts, the improvement comprising:

an overall construction and arrangement of the device which includes means providing a dispersal space around the fusible links for fused material whereby reformation of a fused link is prevented.

3. In a portable electrical device including a plurality of electrical contacts adapted and arranged to contact mating electrical contacts of a master system, the master system being accessed by placing the device contacts against corresponding master system contacts; the portable device further including a common conductive means and individual electrical connections extending between each of the electrical contacts and the common conductive means, each of the electrical connections further including an encapsulated fusible link, whereby the portable device may be "coded" by selectively applying a fusing current to certain of the links and creating a predetermined pattern of electrical contacts capable of having either first or second voltage states when appropriately electrically connected into the master system, the improvement comprising:

an overall construction and arrangement of the device which includes means providing a dispersal space around the fusible links for fused material whereby reformation of a fused link is prevented.

4. In a portable electronic device of the type constructed and arranged for insertion into a mating receptacle, comprising: a molded plastic device body and a printed circuit substrate board enclosed within the device body, the board including at least one common electrical terminal pad and also including a plurality of spaced indentations provided by exposed portions of plated through-holes on the board, the indentations being arranged along the length of the board on at least one edge thereof, each indentation extending across the edge of the board from one surface thereof to the other and being provided with a plated conductive area which is exposed exteriorly of the device body whereby each indentation serves as an electrical contact surface for mating with contacts in the receptacle, the discrete conductive pathways extending between each of the conductive areas and terminating in connection with the common electrical terminal pad on the printed circuit board, each of the pathways including a fusible link constructed and arranged to be selectively fused by passage of electricity therethrough for encoding purposes before use of the device, the improvement comprising:

an overall construction and arrangement of the device which includes means providing a dispersal space around the fusible links for fused material whereby reformation of a fused link is prevented.

5. The article of manufacture according to claim 4 in the form of a key.

6. The article of manufacture according to claim 4 in the form of a substantially flat device.

7. The article of manufacture according to claim 4 in the form of a card.

8. The article of manufacture according to claim 4 in the form of a tag.

9. The device of claim 1 in which the means for providing the dispersal space comprises a cap-like body including means defining a raised space therein which is positioned above at least one link.

10. The device of claim 9 in which the device includes a plurality of links arranged and disposed in a central location and the cap-like body is positioned above that central location so as to provide the dispersal space.

11. The device of claim 2 in which the means for providing the dispersal space comprises a cap-like body including means defining a raised space therein which is positioned above at least one link.

12. The device of claim 2 in which the device includes a plurality of links arranged and disposed in a central location and the cap-like body is positioned above that central location so as to provide the dispersal space.

13. The device of claim 3 in which the means for providing the dispersal space comprises a cap-like body including means defining a raised space therein which is positioned above at least one link.

14. The device of claim 3 in which the device includes a plurality of links arranged and disposed in a central location and the cap-like body is positioned above that central location so as to provide the dispersal space.

15. The device of claim 4 in which the means for providing the dispersal space comprises a cap-like body including means defining a raised space therein which is positioned above at least one link.

16. The device of claim 4 in which the device includes a plurality of links arranged and disposed in a central location and the cap-like body is positioned above that central location so as to provide the dispersal space.

* * * * *